Jan. 28, 1941.　　　A. BOSTROEM　　　2,229,955
ELECTRICAL APPLIANCE
Filed Nov. 8, 1937　　　3 Sheets-Sheet 1

INVENTOR.
AUGUST BOSTROEM
BY
ATTORNEYS

Jan. 28, 1941.  A. BOSTROEM  2,229,955

ELECTRICAL APPLIANCE

Filed Nov. 8, 1937  3 Sheets-Sheet 2

INVENTOR.
AUGUST BOSTROEM
BY
ATTORNEYS

Jan. 28, 1941.   A. BOSTROEM   2,229,955
ELECTRICAL APPLIANCE
Filed Nov. 8, 1937   3 Sheets-Sheet 3

INVENTOR.
AUGUST BOSTROEM
BY
ATTORNEYS

Patented Jan. 28, 1941

2,229,955

UNITED STATES PATENT OFFICE 2,229,955

ELECTRICAL APPLIANCE

August Bostroem, Brooklyn, N. Y., assignor to American Safety Razor Corporation, Brooklyn, N. Y., a corporation of Virginia Application November 8, 1937, Serial No. 173,287

14 Claims. (Cl. 172—36)

This invention relates to electrical appliances such as electrically operated tools, and in particular to electrical appliances that are adapted for use on sources of electric power of different voltages and in one of its phases it relates to an arrangement for the automatic adjustment of such appliances whereby they are adapted for use on any one of a given set of voltages without any manual adjustment thereof.

The user of an electrical appliance, such as an electrically operated dry shaver, for example, is often faced with the difficulty that he is unable to use his appliance because, although a source of electric current may be available it is not of the correct voltage to permit operation of his device. For example, if he is traveling he may find the voltage of the current at his hotel to be 110 volts whereas the voltage on a railroad train may be 12 volts and therefore he is unable to use the shaver that served him at the hotel in the railroad train. Other voltages that may be encountered are 6 volts, as on a trailer, or 32 volts, as in farm lighting installations.

Where an electrical appliance is constructed so as to be adapted for use on different voltages, it may be provided with switching arrangements, the setting of which changes the internal connections of the parts of the apparatus. If settings of the switching arrangements are effected manually, they depend entirely on the human factor, and unless resort is had to fuses or other protective devices, which are troublesome to adjust or replace the user of the appliances sooner or later will neglect to set his device properly and such mistake may result in burning out or otherwise injuring the appliance.

It is the general object of my invention to provide an arrangement whereby an electrical appliance may be used on any one of a given number of predetermined voltages without any manual setting thereof being necessary, so that, for instance, where the connection to the source of current is made by means of a plug, it is merely necessary to plug into a source of current having any one of the aforesaid predetermined voltages in order to have the appliance operate, the proper setting being effected automatically.

It is a further object of my invention to provide in connection with an electrical appliance, a device which may be electrically interposed between the appliance and a source of electric current, and within which an adjustment will automatically take place when said device is plugged into one of a plurality of sources of current having different voltages, which will adapt the appliance for operation on the selected voltage.

In several of the embodiments illustrated my invention is shown applied to a dry shaver provided with an electric motor for the operation thereof, but it will be obvious that it is equally applicable to other electric motor driven tools and electric motor driven appliances of any kind, and it will further be understood that it is not limited to electrical appliances having motors associated therewith, but is applicable to electrical appliances of other types.

For the attainment of these objects and such other objects as will hereinafter appear or be pointed out I have shown several illustrative embodiments of my invention in the drawings, in which.

Figures 1, 2, 5:
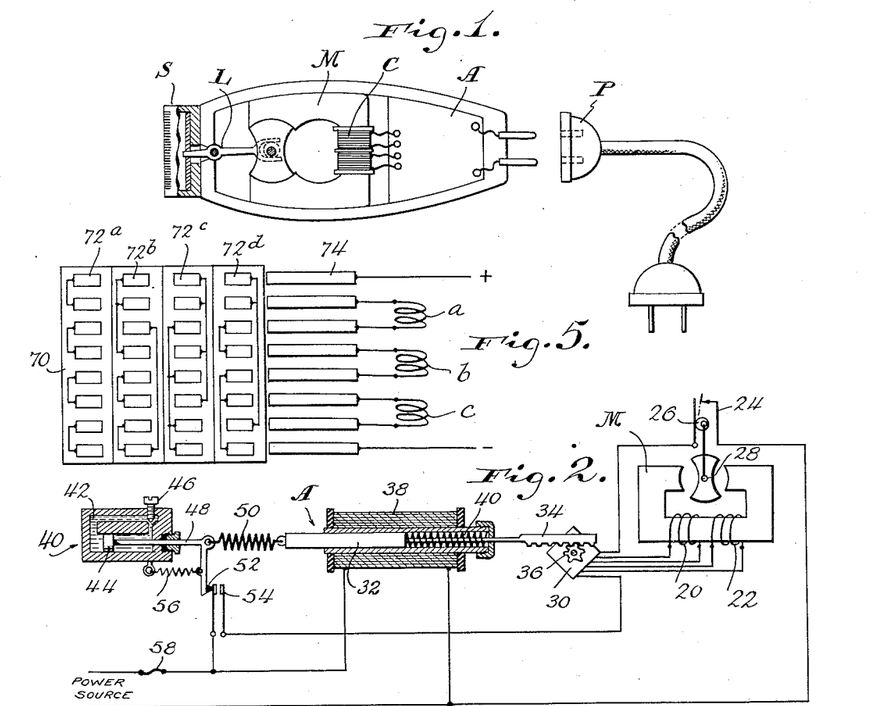
Figure 1 is a plan view of a dry shaver constructed according to my invention, with portions broken away so as to expose the interior parts thereof.
Figure 2 is a diagrammatic view showing the electrical circuits whereby the automatic adjustment of the dry shaver for different voltages may be effected.
Figure 5 is a diagrammatic view of the circuits that may be used in a switching arrangement such as shown in Figure 2 for adjusting the dry shaver to different voltages, the circuits shown however being different from those of Figure 2.

Referring now to the drawings for a detailed disclosure of the various embodiments of my invention it will be observed that in Figure 1 I show an electrically driven dry shaver having a shaving head S comprising interacting sets of shearing teeth that are reciprocated relatively to each other by an electric motor M, from which motion is transmitted to the shaving head S by an oscillating lever L, and the motor is shown as provided with a plurality of field coils C connected to an arrangement denoted collectively by A, within which the connections between the field coils C may be changed, so as to adapt the motor for operation on any one of a number of predetermined voltages. The dry shaver is shown as adapted for connection to a source of power by means of a cord and plug arrangement P by which the electricity passes through the assembly A before entering the coil C.

Referring now to Figure 2 I have therein shown the details of an assembly A such as might be used to change the voltage setting in the dry shaver of Figure 1, and I have further shown the application of this assembly to the circuits of a motor M of the magnetic type, that is a type in which an unwound armature of magnetic material, is used which is caused to rotate by the intermittent impulses given thereto by the intermittent magnetization of the field magnet. For this purpose the field coils of the motor are intermittently energized by a make and break system at appropriate times.

In Figure 2 the motor is indicated as a whole by M, and it is shown as having two field coils 20 and 22 and these are energized intermittently by the operation of a make and break system 24, comprising a pair of contacts caused to separate periodically by an eccentric or cam 26 connected to the armature shaft 28, as by mounting it thereon. By means of a switching arrangement, shown at 30, the connection between the coils 20 and 22 may be changed so that, for example, for one voltage they might be connected in parallel and for another voltage in series. The switching arrangement 30 is shown as rotatable to effect this setting and it may be of the commutator type which will be hereinafter discussed in connection with Figures 5 and 6, and setting of this switching arrangement is shown as effected by a plunger 32, made of magnetic material, having an extension 34 thereon provided with teeth that engage the pinion 36 serving to set the switch 30. The position of the plunger 32 is shown as determined by a solenoid 38 which is thrown across the power source and which exerts a pull on the plunger 32 that is proportional to the voltage impressed on the coil 38, and, as the plunger 32 is free to move within the solenoid 38, however against the resistances of a compression spring 40, for any given voltage the plunger 32 will assume a predetermined position, and this predetermined position will correspond to a definite setting of the switch 30.

Since in the arrangement described the circuits will first be set for the lower voltages and only finally for the higher voltage arrangement, there evidently might be danger where the appliance is thrown on a high voltage that the coils 20 and 22 might be burned out due to the sudden inrush of current into the coil or coils, which are connected for low voltage, and to prevent such an occurrence I may provide a time delay device which will prevent the passage of current into the coils 20 and 22 until the setting of the switch 30 has effected the proper setting by which the coils 20 and 22 are adapted to receive the voltage of the current source to which connection has been made. For this purpose I have shown a dash pot arrangement 40 provided with a cylinder 42 filled with some suitable full bodied fluid such as oil, within which operates a plunger 44, and a by-pass arrangement controlled by the screw 46 provides for adjustment of the time of operation. The dash pot plunger 44 is provided with a stem or rod 48 which is shown as connected to the plunger 32 through a tension spring 50 and this plunger is also shown as carrying a contact 52 adapted to touch a resiliently supported contact 54 as it moves toward the right, as seen in Figure 2. A tension spring 56 causes the return of the dash plot plunger 44 when the tension of spring 50 is reduced sufficiently to permit it to do so, as when the solenoid 38 is deenergized. The contacts 52 and 54 constitute a switch arrangement which prevents the entry of current into the coils 20 and 22 until the closing of the circuit by said contacts, and when said contacts are separated the coils 20 and 22, as well as the switching arrangement 30, are not energized.

It will be observed that when the appliance is connected to the power source the plunger 32 will be caused to move into a predetermined position dependent on the voltage, and will tension the spring 50 and cause the dash pot plunger 44 to move to the right as seen in Figure 2. However, while the plunger 32 moves instantaneously for all practical purposes, the movement of the plunger 44 will be retarded, and consequently the closing of the contacts 52 and 54, which is necessary before the coils 20 and 22 can be energized, is delayed until the switch 30 is set. When the device is disconnected from the power source on the other hand the spring 56 will cause the return of the plunger 44 into its initial position in which it is at the left hand of the cylinder 42.

In order to protect the circuits I may, as an additional precaution, interpose one or more fuses 58 between the device just described and the power source. It is further obvious that instead of the single pair of contacts 52 and 54 that break only one of the wires leading to the switching arrangement 30 and the coils 20 and 22, I may use other circuits such as a circuit in which both of the wires are broken. While I have shown the delayed closing of the circuits as effected by a dash pot, it will be understood that other devices may be used for this purpose.

Figure 3:
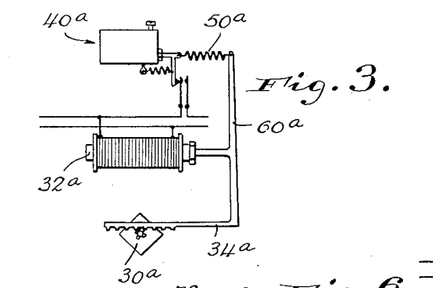
Figures 3 and 4 are diagrammatic views showing respectively, in outline, modified arrangements of the parts shown in Figure 2.
Figure 4:
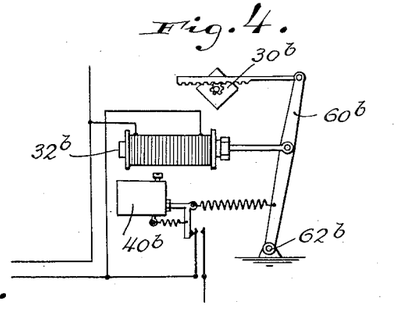

In Figure 2 I have shown an illustrative assembly of parts that will perform the desired function in a simple form, but the arrangement there shown may be objectionable where only a limited space is available to accommodate the assembly A, as where it is to be placed within a small space in the casing of a dry shaver. In Figures 3 and 4 I have therefore shown two arrangements by which greater compactness may be secured. In these figures corresponding parts have been numbered or lettered similarly to those of Figure 2 but the letter *a* has been associated with the numbers of Figure 3 and the letter *b* with the numbers of Figure 4.

In Figure 3 the plunger 32a is shown as connected to a transversely disposed element 60a which carries at one end thereof the rack bar 34a to actuate the switching arrangement 30a, while its other end is connected to a spring 50a which transmits motion to the plunger of the dash pot 40a. The plunger 32a, element 60a and rack 34a move as a rigid unit. Further description is unnecessary, since the functioning of this arrangement is identical with that described for Figure 2.

In Figure 4 the plunger 32b is shown as arranged to impart movement to a pivoted element 60b, the pivot whereof is shown at 62b, and through connections similar to those described for Figures 2 and 3, the switching arrangement 30b is set, and the time delay is effected by the dash pot arrangement 40b, these being activated respectively from the element 60b.

In Figure 5 is shown a diagram of connections for a switching arrangement such as might be used for the part 30 of Figure 2. However it has been shown in connection with three coils a, b, c, instead of with the two coils 20 and 22 of Figure 2.

Figure 6:
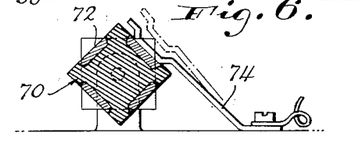
Figure 6 is a side view of a switch in which the wiring shown diagrammatically in Figure 5 may be employed.

In Figure 6 has been shown in end view a physical embodiment of a switch that might be used in connection with a device using the connections of Figure 5. In this figure 70 represents a prismatic member of insulating material, shown in end view, mounted to pivot on its longitudinal axis and carrying conducting segments 72 on the flat faces thereof. A contact 74, which may may be either resilient or resiliently mounted, is shown as contacting with one of the segments 72 carried on one of the faces of the member 70. It will be obvious that the position of the member 70 shown in Figure 6 is one of stable equilibrium, into which the member 70 will tend to return when displaced therefrom due to the pressure of the contact 74 thereon, and that as the member 70 is rotated about its axis into the dotted line position of Figure 6, the member will assume a position of unstable equilibrium from which it will tend to move either into its original position or into a similar position with the contact 74 pressing on the adjoining flat face of the member 70, in which position the contact 74 will overlie another segment 72. Each one of the equilibrium positions will correspond to one of the settings of the consumers of electricity such as coils a, b, c of Figure 5 connected to the segments 72, of which there may be a whole row on each face of member 70, and it will be understood that for each segment 72 in a row there will be a contact 74.

Reverting now to Figure 5 it will be observed that I have there shown a row of contacts, indicated, as in Figure 6, by the numeral 74, eight of these being shown. The outer ones are connected to the line wires denoted by a plus and a minus sign respectively, and the inner ones are connected to the terminals of coils a, b, and c, a pair of adjacent segments being used for each coil. The conducting segments, corresponding to the segments 72 of Figure 5, are shown as arranged in rows of eight, one row on each of the four faces of the member 70 and these segments 72 are shown as interconnected in such a way with each other and with the coils a, b and c that when the contacts 74 are in contact with the first row of terminals, 72a, the coils a, b, c are thrown in series. When the contacts 74 touch the terminals 72b, the coils b and c are thrown into series and this series arrangement of coils b and c is thrown into multiple with coil a.

When the contacts 74 touch the segments 72c the coils a, b, and c are thrown into multiple, while in the last setting, in which the terminals 74 are in contact with the segments 72d, the coils a and b are thrown into series and this series arrangement of a and b is in multiple with the coil c.

By making the coils a, b and c of suitable resistances and current carrying capacities the appliance may be adapted for use on four different voltages. It will be understood of course that although the switch or commutator just described is restricted to four settings, that this is by way of illustration merely and that it may be adapted for any desired number of settings.

While I have described the use of a time delay arrangement in the embodiment of Figure 2, it will be understood that under certain circumstances such a delay arrangement may be dispensed with, for instance, by suitably providing for sufficient dissipation of heat from the coils and by making the wires thereof of sufficient capacity it may be found that there is no danger of burning out the coils even when a low voltage interconnection thereof is exposed to the action of a high voltage. To provide for this condition I have shown in Figure 7 an arrangement in which no time delay device is employed and in which use is made of a different type of switching arrangement, which has the advantage of great simplicity. In this figure I have shown a motor K, also of the magnetic type, and provided with three coils 80, 82 and 84. Associated with these coils are paired contacts 86 and 88, and 90 and 92, and the contacts 86 and 90 are shown as resilient and as having their ends extending into the path of a member 94 provided with spaced fingers 96 and 98 that are adapted respectively to move the contacts 86 and 90 so as to open the circuits normally closed by said contacts, and the member 94, which is in the form of a bell crank is connected for movement by a plunger 100 slidable in a solenoid 102, which is thrown across the power source and moves the plunger 100 against the tension of spring 104 into a position determined by the voltage of the power source. It will be observed that the coils 80, 82 and 84 are connected in series with the make and break system of the motor, indicated at 106, and this whole system is thrown across the power source. The contact 88 is connected to the meeting point of coils 80 and 82, while the contact 92 is connected to the meeting point of coils 82 and 84. Contacts 86 and 90 are connected to one side of the line.

Figures 7, 8:
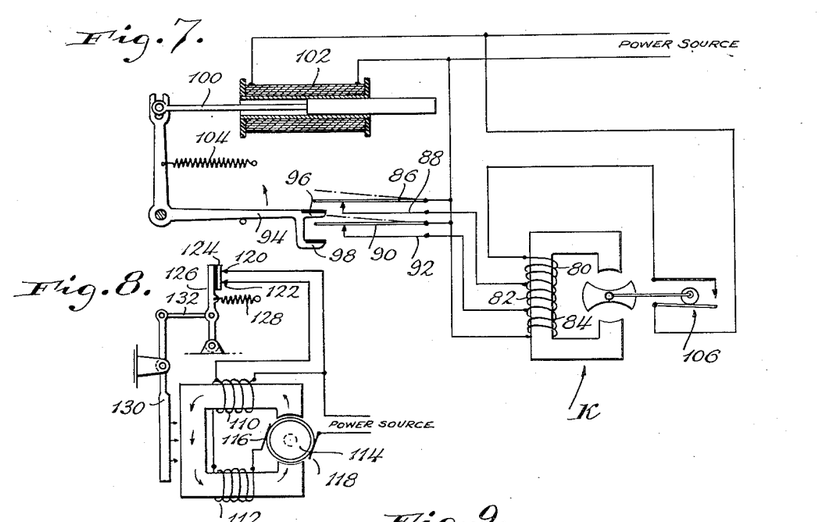
Figure 7 is a diagrammatic view showing the electric circuits of another embodiment of my invention.
Figure 8 is a diagrammatic view showing my invention applied to a form of motor different from the one shown in the embodiment of Figure 1.

It will be observed that as long as the contacts 86 and 88 touch each other the coils 82 and 84 are short circuited, and that as long as the contacts 90 and 92 touch each other the coil 84 is short circuited. As a result when the device is thrown on the power source and before the plunger 100 has begun to effect any setting only the coil 80 is energized, the other coils being short circuited, and this may correspond to the lowest voltage setting of the appliance. These connections will remain undisturbed until movement of the plunger 100 causes the finger 96 to move the contact 86 away from its companion contact 88 so as to break the circuit at this point, with the result that the coils 80 and 82 are now actively in series, and this would correspond to the second setting. At a still higher voltage the finger 98 engages the contact 90 and moves it away from its companion contact 92, and in this position all three coils 80, 82 and 84 are in series and energized from the line, and this would correspond to the third and highest voltage setting.

In the modification of Figure 8 I have shown a commutator type of electrical motor having two coils and a device for interconnecting these coils so as to adapt the motor for use on two different voltages associated with said motor, and the setting is effected by the magnetism generated in the field coils of the motor, whereby the need for a special solenoid or other device for effecting the setting of the coils is obviated. For this purpose I have shown a motor having field coils at 110 and 112 and an armature 114. The motor is shown as of the series type and current is introduced into the armature through a pair of brushes 116 and 118. The coil 110 is shown as adapted to be short circuited through a pair of contacts 120 and 122 that may be connected to each other through a bridge piece 124 mounted on a pivoted lever 126 which is pulled in a direction so that the bridge piece 124 normally tends to connect the contacts 120 and 122 by a spring 128, and this lever 126 may be displaced against the resistance of the spring 128 so as to break the connection between the contacts 120 and 122 by means of a pivotally mounted armature 130 connected to the lever 126 by a link 132. It will be observed that when the motor is thrown on a low voltage the armature 130 will be only feebly attracted and by making the spring 128 sufficiently strong no movement of the bridge piece 124 will take place, so that the coil 110 will remain short circuited and current flows only through the coil 112, the resistance of which is made low enough so that sufficient current will be forced therethrough to operate the motor. When on the other hand the motor is thrown on a higher voltage the armature 130 will be attracted with sufficient force to overcome the resistance of the spring 128 so as to open the contacts 120 and 122, whereby the field coil 110 is thrown in series with the field coil 112, and thereby sufficient resistance is introduced into the field circuit to adapt it for operation on the higher voltage.

It will be observed that while I have shown the armature 130 in a position intermediate the poles, that if a stronger attraction is desired it may be positioned nearer the poles, and may even bridge the poles.

Figures 9, 10, 11:
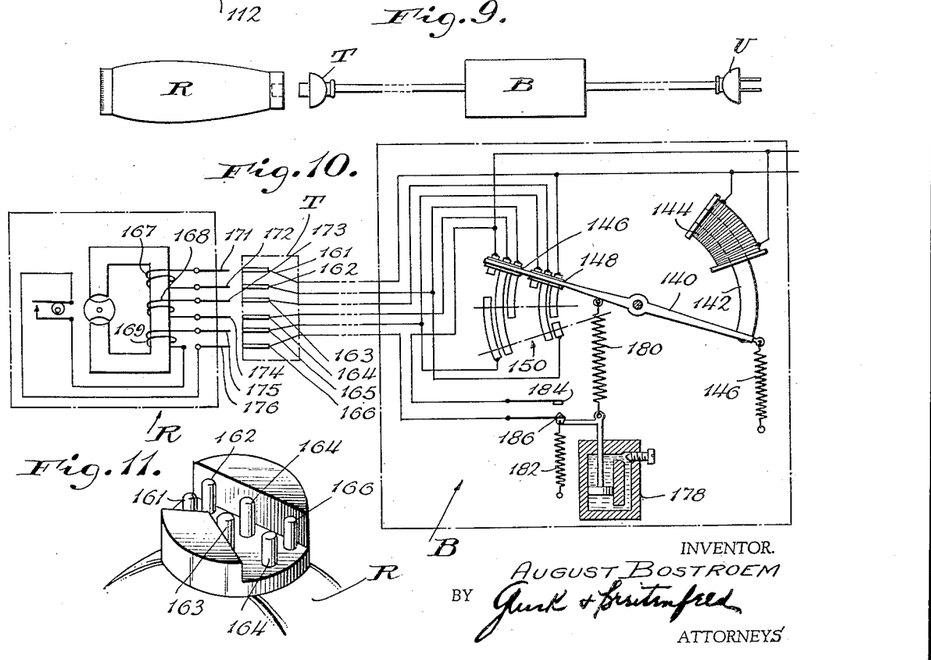
Figure 9 is a view of another embodiment of my invention in which the voltage adjustment is effected in a device adapted to be positioned intermediate the dry shaver and a source of electric power.
Figure 10 is a diagrammatic view of the electric circuits used in the embodiment of Figure 9.
Figure 11 is a perspective view of a detail of the embodiment of Figure 9.

In Figures 9, 10 and 11 I have illustrated an automatic voltage regulating device separate from the appliance with which it is to be used, and in these figures it is shown as forming a part of the cord and plug system. In Figure 9 the dry shaver is indicated at R, and at T is shown a plug of special configuration and construction adapted to fit into the dry shaver R and connected to an automatic voltage regulating device B which also carries a plug U whereby it may be connected to a source of power.

The details of the electrical circuits of the voltage regulating device B and its plug T and of the electrical circuit of the motor of the dry shaver R of Figure 9 are shown in Figure 10. The device B is shown as provided with a pivotally mounted lever 140 carrying at one end an arcuately contoured armature 142 adapted to enter the opening in an arcuately contoured solenoid 144, and a tension spring 146 is shown connected to the lever 140 so as to oppose the pull of the solenoid 144. At the end of the lever opposite to that carrying the armature are shown a pair of conducting bridge pieces 146 and 148, and these are slidable over a series of conducting segments denoted collectively by the numeral 150 and connected to six leads or conductors connected respectively to a set of terminal sockets numbered serially from 161 to 166, these sockets being located within the plug T. The motor R is shown as provided with three coils 167, 168 and 169, and these are connected, each to a pair of terminal posts adapted to fit into the aforementioned sockets 161 to 166, of the plug T and these terminal posts being numbered serially from 171 to 176.

A time delay device in the form of a dash pot 178 for performing a function similar to dash pot 40 of Figure 2 is shown connected to the lever 140 through the spring 180, having a function similar to that of the spring 50 of Figure 2, while the spring 182 insures the return of the plunger of the dash pot 178 into its initial position and also insures opening of the paired contacts 184 and 186.

The electrical connections are so arranged that when the device B is connected to a power source, as through the plug U, the solenoid 144 will be thrown across the line and will exert a pull on the armature 142 depending on the voltage and will cause the bridge pieces 146 and 148 to slide over the commutator bars 150 into a position determined by the pull of the solenoid 144 on the armature 142.

The arrangement of the commutator bars is such that as the conducting bridge pieces 146 and 148 slide thereover from the top position to the bottom position these coils will be interconnected consecutively in the following ways: (1) 167, 168 and 169 are in parallel (this is the full line position of the lever 140); (2) 167 and 168 are in parallel and in series with 169 (this is the middle position of the lever 140); (3) 167, 168 and 169 are in series (this is the lowest position of lever 140).

It will be understood from the preceding description that in order for the voltage adjustment in the device B to properly effect its function in relation to the motor R that the terminal posts 171 to 176 must be properly mated with the sockets 161 to 166, that is, 171 must fit into 161, and 172 into 162, etc. In order to secure this result I have shown the dry shaver R in Figure 11 as having the terminal posts 171 to 176 arranged in an irregularly contoured recess in the end of the shaver casing, and it will be understood that the plug T will have a male portion shaped so as to be complementary to this irregularly shaped recess, so that it can only fit thereinto in one position. As an additional safeguard the terminal posts 171 to 176 may be arranged irregularly and may be of different thicknesses, and the sockets 161 to 166 of plug T must of course be similarly arranged and be of complementary dimensions.

In those embodiments of my invention showing its application to dry shavers I have shown its use in connection with rotary electric motors. However it will be obvious that it may be used equally well on dry shavers that are actuated by a "buzzer" type of mechanism, in which motion of the shaver parts is effected by the attraction of one or more solenoids on one or more armatures.

Figures 12, 13, 14, 15, 16:
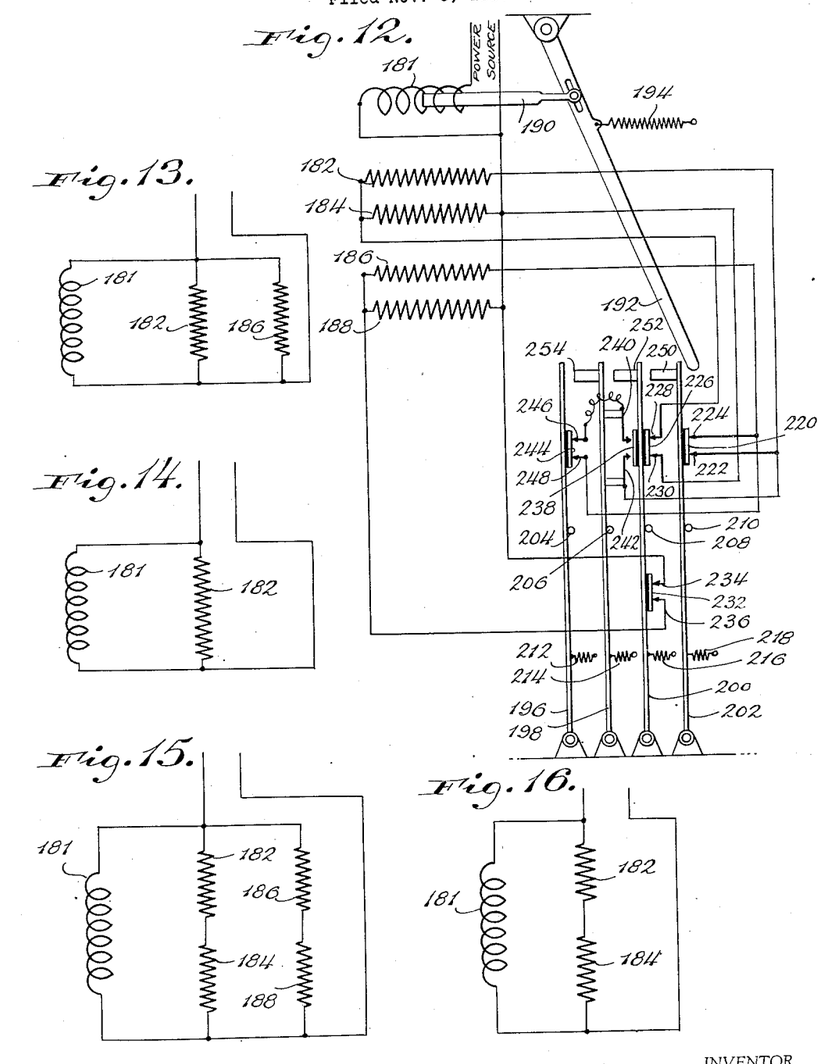
Figure 12 is a diagrammatic view of still another embodiment of my invention.
Figures 13, 14, 15 and 16 show respectively four different settings that are possible with the arrangement of Figure 12.

In Figure 12 I have shown a further embodiment of my invention. The appliance in this case is shown with five consumers of electricity and the switching mechanism is adapted to interconnect these so as to adapt the appliance for use on four different voltages. One of the consumers is shown as acting as a solenoid to attract the armature. While this type of embodiment may be adapted for certain types of motors, in its particular illustrated form it is better suited for appliances of other types such for instance as a heating pad or an electric toaster.

In Figure 12 the consumers of energy are indicated at 181, 182, 184, 186 and 188, and the first of these is shown in the form of a solenoid adapted to function as a resistor and at the same time to receive therewithin the armature 190, while the others are shown as simple resistors. The armature 190 is shown as connected to a pivoted lever 192, and a tension spring 194 exerts a pull on said lever opposed to the pull of the solenoid 181 on the armature 190. A series of pivoted levers of insulating material, numbered respectively 196, 198, 200 and 202, and drawn respectively against the stops 204, 206, 208 and 210 by springs 212, 214, 126 and 218 are shown as mounted adjacent to each other and as provided with means acting between them, such as the protuberances 250, 252 and 254, so that as the end of the lever 192 moves to the left as shown in Figure 12 it will first move the lever 202 to the left, which will move the lever 200 to the left. The lever 200 will move lever 198 to the left which in turn will move the last of the levers 196 also to the left.

The lever 202 is shown as carrying the conducting bridge piece 220 which effects connection of the contacts 222 and 224 when it is in its right hand position. The lever 200 on its right hand side is shown as carrying the conducting bridge piece 226 adapted to effect connection between contacts 228, 230 and also as carrying a second bridge piece 232 adapted to effect connection between contacts 234 and 236. On its left side the lever 200 is shown as carrying a third bridge piece 238, which is normally spaced from, but in its motion to the left is adapted to effect connection between contacts 240 and 242 which are shown as carried by the lever 198. Finally the lever 196 carries the bridge piece 244, which in its normal position at the left effects connection between contacts 246 and 248.

With the levers 196, 198, 200 and 202 in their extreme right hand position, as shown in Figure 12, the connections that are effected are indicated in Figure 13, with the resistors 181, 182 and 186 in multiple, the resistors 184 and 188 being short circuited by the connections shown, and this will correspond to the lowest voltage position in which the voltage is not strong enough to cause sufficient movement of the armature 190 into the solenoid to actuate the lever 202.

When a higher voltage is applied the armature 190 will be drawn into the solenoid 181 and will move the lever 192 to the left (as shown in Figure 12) and this in turn will cause lever 202 to move to the left and break the connection between the contacts 222 and 224. This may correspond to a second setting in which only the resistors 181 and 182 are energized, the other resistors being open circuited or short circuited. The result of this setting is shown in Figure 14.

On further raising the voltage the lever 202 will move further to the left, as shown in Figure 12, and its protuberance 250 will push lever 200 to the left, thereby breaking the connection between the contacts 228 and 230 and contacts 234 and 236, and at the same time effecting a connection between contacts 240 and 242, due to the movement of bridge piece 238 against them. It will further be recalled that there is no connection between contacts 222 and 224 because the lever 202 has not returned to its right hand position in which the bridge piece 220 effects a connection between the said contacts. The resulting interconnection of the resistors is shown diagrammatically in Figure 15, and it will be observed that resistor 182 is thrown into series with resistor 184, and resistor 186 is thrown into series with resistor 188, and these two sets of resistors are in parallel with each other and with resistor 181.

If a still higher voltage is applied the protuberance 252 of lever 200 will contact the lever 198 and move the latter to the left, which in turn will move the lever 196 to the left due to the push of the protuberance 254 of lever 198 against the lever 196; this will move the bridge piece 244 to the left, so as to break the connection between the contacts 246 and 248 while at the same time the connection between the contacts 240 and 242 remains unbroken. This corresponds to the setting illustrated in Figure 16 in which the resistors 182 and 184 are in series and is the highest voltage setting of which the illustrated embodiment is capable.

It will be observed that if only two voltage settings are desired, this could be accomplished with two resistors 182 and 186, the resistor 182 in that case being made in the form of a solenoid and receiving the armature 190. The two settings would then be as in Figures 13 and 14 with solenoid 181 omitted.

It will be understood that, while I have shown my invention embodied in appliances in which the changes in connections for voltage changing purposes are made between operative parts of the appliances, for certain purposes it may be found desirable to effect these changes in connections between consumers of electricity that are not properly parts of the appliance. For instance, resistors may be interposed between the appliance proper and the source of electric energy and the connections between these resistors changed so as to change the voltage at the terminals of the appliance proper. For example, in Figure 2, the coil 20 might be extraneous to the motor.

It will further be understood that whereas in the embodiments herein disclosed I have shown the solenoid or other devices which effect the changes in setting for different voltages, as exposed to the full line voltage, that such devices may be subjected only to a fraction of said line voltage, as by having resistors connected in series with them. For example, in Figure 2, the solenoid 38 instead of being connected across the power source might have a resistance connected in series therewith.

While I have herein disclosed several illustrative embodiments of my invention it will be understood that my invention may be embodied in many other forms as will be obvious to those skilled in the art, and that the disclosure herein is by way of illustration merely and is not to be construed in a limiting sense and that I do not limit myself in any way other than as called for by the prior art.

Having thus described my invention and illustrated its use, what I claim as new and desire to secure by Letters Patent, is:

1. In an electrical appliance adapted for operation from an electric power source having one of a plurality of predetermined voltages, in combination, terminals for connecting said appliance to an electric power source, an electro-dynamically actuated member energized from said terminals and movable into any one of a plurality of positions, the particular position to which it moves being determined by the particular line voltage of the electric power source to which the terminals of the appliance are connected, a plurality of consumers of electric current constituting part of the main operative elements of the appliance, interconnecting means for interconnecting said consumers and said terminals in a plurality of ways so as to adapt the appliance for operation on any one of a plurality of predetermined voltages, and means whereby the movement of said member is caused to set said interconnecting means to interconnect said consumers in a way that will adapt the appliance for operation on the particular voltage of the power source to which the terminals of the appliance are connected, make and break means intermediate said consumers and said terminals, and time delay means adapted to delay the closing of said make and break means, when the terminals thereof are connected to a power source, until after said interconnecting means has been caused by said movable member to effect interconnection of said consumers to adapt the appliance for operation on said power source.

2. In an electrical appliance adapted for operation from an electric power source having one of more than two predetermined voltages, in combination, terminals for connecting said appliance to an electric power source, an electrodynamically actuated member connected to said terminals and movable into one of more than two positions, the particular position to which it moves being determined only by the particular line voltage of the electric power source to which the terminals of the appliance are connected, a plurality of consumers of electric current constituting part of the main operative elements of the appliance, interconnecting means for interconnecting said means with said terminals in more than two ways so as to adapt the appliance for operation on one of said predetermined voltages, and means whereby the movement of said member is caused to set said interconnecting means to interconnect said consumers in a way that will adapt the appliance for operation on the particular voltage of the power source to which the terminals of the appliance are connected, make and break means intermediate said consumers and said terminals, and time delay means adapted to delay the closing of said make and break means when the terminals thereof are connected to a power source, until after said interconnecting means has been caused by said movable member to effect interconnection of said consumers to adapt the appliance for operation on said power source.

3. A device adapted for use with an electrically operated dry shaver having a set of conductors therein and said conductors being connected to consumers of electricity forming part of the dry shaver, said device having a set of conductors therein matched to the set of conductors in the dry shaver, means for connecting said device to the dry shaver so that said matched conductors are connected in paired relation to form paths for electric current, means for connecting said device to a source of electric power, means in said device for interconnecting said conductors in the device in a plurality of ways, each of said ways adapting the dry shaver for operation on a particular voltage when said device is connected to said dry shaver, and means in said device responsive to the voltage of the power source to which said device is connected for setting said conductor-interconnecting means to effect such an interconnection of said conductors as to adapt said dry shaver for operation on the voltage of the power source to which said device is connected and a time delay device for preventing passage of current into said conductors until said interconnecting means has functioned to interconnect said conductors so as to adapt said dry shaver for operation on the voltage to which said device is connected.

4. In an electrical appliance adapted for selective operation from any one of a plurality of electric power sources, each of said sources having a predetermined voltage different from that of the other sources, in combination, complementary connecting means on said power source and said appliance whereby said appliance may be selectively connected to any one of said power sources, an electrodynamically actuable member in said appliance, connections for said appliance whereby it is energized from a power source to which said appliance is connected, said member being movable into any one of a plurality of positions each of which corresponds to one of said predetermined voltages, and the particular position to which it moves being determined by the particular line voltage of said electric power source to which the appliance is connected, a plurality of consumers of electric current constituting at least a part of the load or main operative elements of the appliance, electrical interconnecting means for interconnecting said consumers in a plurality of ways so as to adapt the appliance for operation selectively on any one of said plurality of predetermined voltages whenever the appliance is connected thereto, and means operable by the movement of said member for setting said interconnecting means to interconnect said consumers in a way to adapt said appliance for operation on the particular voltage of said power source to which said appliance is connected.

5. In an electrical appliance adapted for selective operation from any one of a plurality of electric power sources, each of said sources having a predetermined voltage different from that of the other sources, in combination, complementary connecting means on said power source and said appliance whereby said appliance may be selectively connected to any one of said power sources, an electrodynamically actuable member in said appliance, connections for said appliance whereby it is energized from a power source to which said appliance is connected, said member being movable into any one of a plurality of positions each of which corresponds to one of said predetermined voltages, and the particular position to which it moves being determined by the particular line voltage of said electric power source to which the appliance is connected, a plurality of consumers of electric current constituting at least a part of the load or main operative elements of the appliance, electrical interconnecting means for interconnecting said consumers in a plurality of ways so as to adapt the appliance for operation selectively on any one of said plurality of predetermined voltages whenever the appliance is connected thereto, and means operable by the movement of said member for setting said interconnecting means to interconnect said consumers in a way to adapt said appliance for operation on the particular voltage of said power source to which said appliance is connected, and a separable connection between said consumers and said interconnecting means, whereby the consumers may be positionally and electrically separated from said interconnecting means.

6. In an electrical appliance adapted for selective operation from any one of more than two electric power sources, each of said sources having a predetermined voltage different from that of the other sources, in combination, complementary connecting means on said power source and said appliance whereby said appliance may be selectively connected to any one of said power sources, an electrodynamically actuable member in said appliance, connections for said appliance whereby it is energized from a power source to which said appliance is connected, said member being movable into any one of a plurality of positions each of which corresponds to one of said predetermined voltages, and the particular position to which it moves being determined by the particular line voltage of said electric power source to which the appliance is connected, a plurality of consumers of electric current constituting at least a part of the load or main operative elements of the appliances, electrical interconnecting means for interconnecting said consumers in a plurality of ways so as to adapt the appliance for operation selectively on any one of said plurality of predetermined voltages whenever the appliance is connected thereto, and means operable by the movement of said member for setting said interconnecting means to interconnect said consumers in a way to adapt said appliance for operation on the particular voltage of said power source to which said appliance is connected.

7. In an electrical load appliance adapted for selective operation from any one of a plurality of independent electric power sources, each of said sources being adapted to supply electric current having characteristics different from that of the other sources, said appliance having terminals whereby it may be connected to any one of said sources, said appliance further having a plurality of consumers of electricity therein, a system of connections for interconnecting said consumers and said terminals in a plurality of different ways so as to adapt said appliance for operation from any one of the aforementioned sources, means adapted, when said appliance is connected to one of the aforementioned sources to receive an amount of current therefrom bearing a predetermined relation to the characteristics of the current from said connected source, said last named means comprising a movable part adapted to assume a predetermined position dependent on the amount of said current from said connected source and to return to its initial position when said source is disconnected, said last named means being operative when it assumes said predetermined position to effect connection of said consumers so as to adapt the appliance for operation from the aforementioned connected source.

8. For use with an electrical load appliance adapted for selective operation from any one of a plurality of independent electric sources, each of said sources being adapted to supply electric current having characteristics different from that of the other sources and said appliance having terminals whereby it may be connected to any one of said sources, said appliance further having a plurality of consumers of electricity therein and a set of conductors connecting said terminals and said consumers for supplying said consumers, a device having a set of conductors therein matched to the set of conductors in the appliance, complementary means on said device and said appliance for connecting said respective sets of conductors for connection in paired relation, said device also having terminals whereby it may be connected to any one of said power sources, and means in said device for interconnecting said conductors in the device in a plurality of different ways, and means in said device adapted, when said device is connected to one of the aforementioned sources to receive an amount of current therefrom bearing a predetermined relation to the characteristics of the current from said source, and said last named means having a movable part adapted to assume a predetermined position dependent on the amount of said current and to return to its initial position when said current is interrupted, said last named means being operative for setting said interconnecting means to effect connection of said conductors so as to adapt the appliance for operation from the aforementioned source to which said device is connected.

9. In an electrical appliance adapted for selective operation from any one of a plurality of electric power sources, each of said sources having a predetermined voltage different from that of the other sources, in combination, complementary connecting means on said power source and said appliance whereby said appliance may be selectively connected to any one of said power sources, a movable member in said appliance, connections for said appliance whereby it is energized from a power source to which said appliance is connected, said member being movable into any one of a plurality of positions each of which corresponds to one of said predetermined voltages, and the particular position to which it moves being determined by the particular line voltage of said electric power source to which the appliance is connected, a plurality of consumers of electric current constituting at least a part of the load or main operative elements of the appliance, electrical interconnecting means for interconnecting said consumers in a plurality of ways so as to adapt the appliance for operation selectively on any one of said plurality of predetermined voltages whenever the appliance is connected thereto, and means operable by the movement of said member for setting said interconnecting means to interconnect said consumers in a way to adapt said appliance for operation on the particular voltage of said power source to which said appliance is connected.

10. An electric appliance comprising an electric motor, said motor being provided with a plurality of windings, means for interconnecting said windings in a plurality of ways so as to adapt said motor for operation on any one of a plurality of predetermined voltages, terminals carried by said casing whereby the shaver may be connected to any one of a plurality of sources of electricity, each source having one of the said predetermined voltages, and means for automatically setting said interconnecting means to adapt the motor for operation on one of said predetermined voltages whenever the said terminals are connected to a source having said last named voltage, said means being connected to said terminals for energization from said source when connection of the appliance thereto is effected.

11. An electric appliance comprising an electric motor, said motor being provided with a plurality of windings, means for interconnecting said windings in a plurality of ways so as to adapt said motor for operation on any one of more than two predetermined voltages, terminals carried by said casing whereby the shaver may be connected to any one of a plurality of sources of electricity, each source having one of the said predetermined voltages, and means for automatically setting said interconnecting means to adapt the motor for operation on one of said predetermined voltages whenever the said terminals are connected to a source having said last named voltage, said means being connected to said terminals for energization from said source when connection of the appliance thereto is effected.

12. In an electric appliance terminals for connecting said appliance to a power source, a plurality of windings, a system of electrical conductors, a switch provided with a movable member for interconnecting said windings, said conductors and said terminals in a plurality of ways, each way of connection adapting the appliance for operation on any one of a plurality of predetermined voltages, a solenoid connected to said terminals, an armature movable by said solenoid into positions dependent on the current received by said solenoid, and a connection between said armature and said movable switch member whereby when said armature is moved by the solenoid, said switch member will be moved to effect interconnection of said windings, said conductors and said terminals.

13. An electric appliance comprising a plurality of load coils, a system of electrical conductors, means for connecting said conductors, to said coils in a plurality of ways, each way adapting said appliance for operation on a predetermined voltage that is different for each of said ways, and a member adapted to be moved by one of said load coils to actuate said connecting means.

14. An electric motor comprising a field magnet, a plurality of coils for energizing said field magnet, a system of electrical conductors, means for interconnecting said conductors, and said coils in a plurality of ways, each way adapting said motor for operation on a predetermined voltage that is different for each of said ways, and a member adapted to be moved by said field magnet to actuate said connecting means.

AUGUST BOSTROEM.